Dec. 18, 1962 J. W. SIDWELL 3,068,573
HOLE CENTER FINDER
Filed Oct. 14, 1959 2 Sheets-Sheet 1
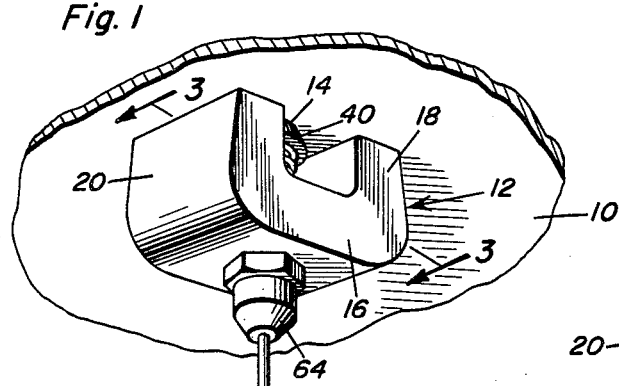
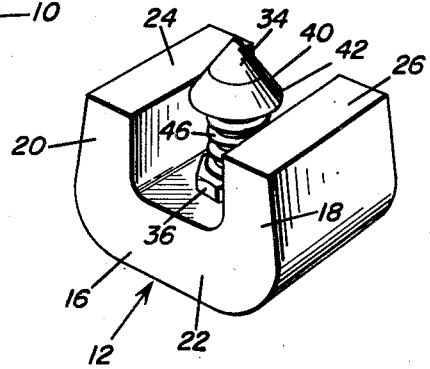
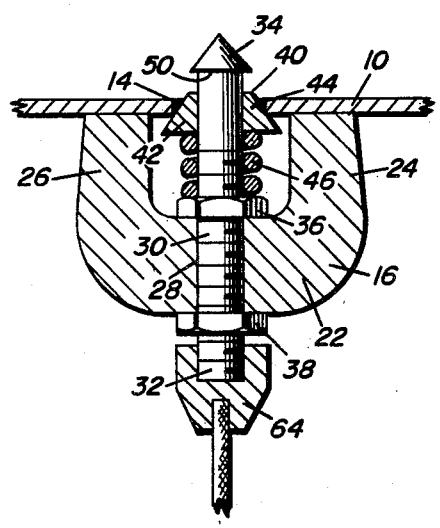
James W. Sidwell
INVENTOR.

Dec. 18, 1962  J. W. SIDWELL  3,068,573
HOLE CENTER FINDER
Filed Oct. 14, 1959
2 Sheets-Sheet 2

James W. Sidwell
INVENTOR.

BY *Clarence A. O'Brien*
and *Harvey B. Jacobson*
Attorneys

United States Patent Office 3,068,573
Patented Dec. 18, 1962

3,068,573
HOLE CENTER FINDER
James W. Sidwell, P.O. Box 1101, Twin Falls, Idaho
Filed Oct. 14, 1959, Ser. No. 846,405
9 Claims. (Cl. 33—1)

This invention relates to tools and more particularly to a center finder.

An object of the invention is to provide a device which will quickly, accurately and automatically indicate the center of a hole in an object, regardless of the shape of the hole so long as the hole has symmetrical sides of equal length.

Briefly, the invention is embodied in a magnetic holder adapted to grip upon a metallic surface with which a magnet may function. The holder supports what is considered to be a unique center finding assembly consisting of a bolt having a pointed end protruding beyond the gripping surface of the holder, and a collar in the form of a truncated cone. The side wall of the collar forms an extension of the side wall of the conical pointed end of the bolt, and the collar is spring loaded.

Accordingly, when the magnetic holder is applied to a surface having a hole in it, the bolt slips through the hole, provided that the hole is large enough, and the collar functions to center the longitudinal axis of the bolt in and on the center of the hole by the action of the truncated conical side wall of the collar with the side wall of the hole.

The holder, and preferably the bolt, is equipped with a threaded end by which to secure a socket in place. The socket may contain a number of instrumentalities, for instance a string in a plumb bob or sighting device, depending on the immediate needs and desires of the user.

Consequently, it is a further object of the invention to provide a hole center finder as aforesaid, which may be used for a number of different purposes, but which is very easy to use and serves its intended purpose well and accurately.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a perspective view of the hole center finder showing one use thereof.

FIGURE 2 is a perspective view of the center finder in FIGURE 1, the plumb bob and string being omitted.

FIGURE 3 is a sectional view taken approximately on the line 3—3 of FIGURE 1.

Figure 4:
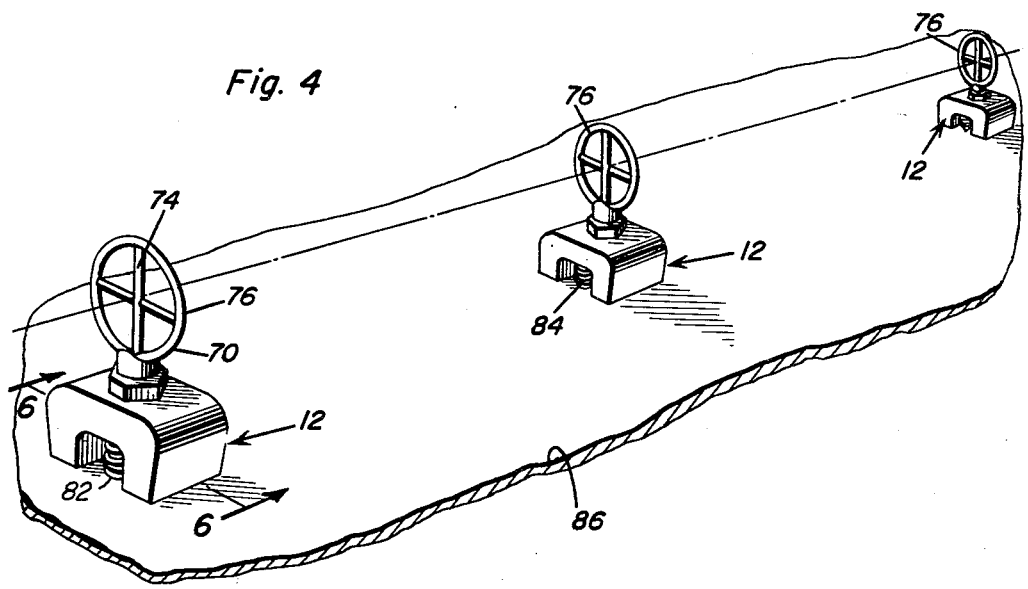
FIGURE 4 is a perspective view showing a second use of the hole center finder.

In the accompanying drawings, there is illustrated a metal surface 10 (FIGURES 1–3) with which center finder 12 is being used. Applications for center finder 12 will be found in many jigs, fixtures, and alignment machines where it is necessary to know the relationships between various lines, planes and centers of holes. Consequently, the surface 10 merely diagrammatically represents any surface having a hole 14 therein with which center finder 12 may have a use.

Structurally, center finder 12 is made of a horseshoe permanent magnet 16 having sides 18 and 20 together with a cross-piece 22. Surfaces 24 and 26 of sides 18 and 20 are the magnetic holding surfaces, these representing the north and south poles of the magnet, and surfaces 24 and 26 are coplanar.

Cross-piece 22 has an aperture 28 extending therethrough and has an axis located on the center line of the magnet 16. An elongate shank, for instance, bolt 30, is disposed in aperture 28 and has a threaded end 32 and an end terminating in a pointed member 34. The pointed end is in the form of a cone and protrudes beyond the plane containing surfaces 24 and 26. Nuts 36 and 38 bearing on opposite faces of cross-piece 22 and threaded on bolt 30 hold the bolt firmly fastened to the magnet 16.

Center finding assembly 40 is on bolt 30 and consists of the pointed member 34 together with a collar 42 shaped with an outer surface 44 in the form of a truncated cone. Collar 42 is slidably disposed on bolt 30, and the angularity of surface 44 is such as to cooperate with the surface of the pointed member 34 in forming a conical shape (FIGURE 2). However, collar 42 is movable on the bolt while member 34 is fixed. Spring 46 constitutes resilient means by which to urge collar 42 into engagement with the shallow shoulder 50 at the inner extremity of member 34. The spring seats on a surface of collar 42 and on nut 36 so that the bias of the spring is in a direction tending to hold assembly 40 in a normal position wherein collar 42 bears against shoulder 50.

Figure 6:
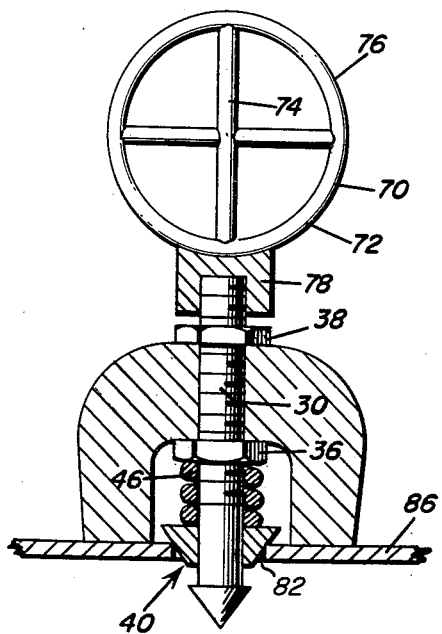
FIGURE 6 is an enlarged sectional view taken on the line 6—6 of FIGURE 4.
Figure 5:
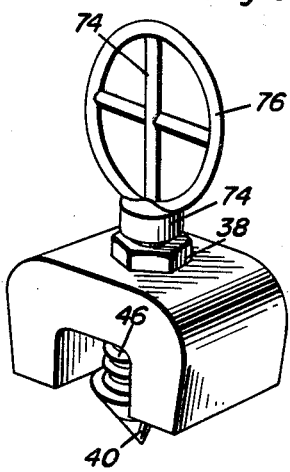
FIGURE 5 is a perspective view of the center finder of FIGURE 4.

The above description of holder 12 applies to the holders shown in FIGURES 1 and 4, these forms of the invention differing only in the attachments that are applied to the holder and in the method of use. One attachment 60 is composed of a string 62 having a socket 64 at one end and a plumb bob 66 at the other end. The socket 64 is internally threaded so that it may be threadedly attached to the end 32 of bolt 30. The distinction between attachment 60 and attachment 70 shown in FIGURES 4–6 is found only in the sighting device 72 having crossed members 74 contained within a ring 76. The ring is secured to socket 78 which is identical in function to socket 64.

In use, the holder magnet 16 is applied to surface 10 with the assembly 40 entering hole 14. If the hole is sufficiently centered with reference to bolt 30, the assembly 40 will immediately function, i.e., spring 46 will compress when collar 44 engages the edge of the hole 14. However, if the longitudinal axis of bolt 30 is slightly off-center, the magnet 16 is slid slightly until such time that a position is achieved at which the surface 44 of collar 42 finds the precise center of the hole for bolt 30. This is true as applied to the use shown in FIGURE 1 and the use shown in FIGURE 4 and any other use which will occur to those persons skilled in this art. When hole 14 has its center found, the plumb bob can be used. In order to find the center for a third hole with reference to a pair of existing holes 82 and 84 in surface 86, for instance, two holders 12 are engaged in holes 82 and 84, and the sighting devices on the two holders 12 are used to sight a straight line therebetween and through an additional holder 12 placed at a position where the third hole in a straight line with holes 82 and 84 would be located.

It is understood that various changes may be made without departing from the invention. For instance, other types of holding devices may be used for special purposes of the hole center finder although the magnet 16 is perfectly satisfactory in connection with work involving ferrous metals. Carpentry work, by and large, would have little call for a magnetic holder. Such a variation as well as many others as fall within the scope of the following claims may be resorted to.

What is claimed as new is as follows:

1. A hole center finder comprising a magnet having a pair of poles established by spaced surfaces, a shank rigidly attached to said magnet and located between said poles, said shank protruding through the plane containing said surfaces and having a pointed end, a collar slidably disposed on said shank, and means on said pointed end retaining said collar captive on said shank, said collar having a truncated conical shaped side surface to engage in a hole.

2. A hole center finder comprising a magnet having a pair of poles established by spaced surfaces, a shank rigidly attached to said magnet and located between said poles, said shank protruding through the plane containing said surfaces and having a pointed end, a collar slidably disposed on said shank, and means on said pointed end retaining said collar captive on said shank, said collar having a truncated conical shaped side surface to engage in a hole, resilient means reacting on said collar and ultimately on said magnet and normally biasing said collar in a direction so that it abuts said pointed end of said shank.

3. The tool of claim 2 wherein said collar retaining pointed end of said shank includes a shoulder against which said collar abuts.

4. The tool of claim 2 wherein said shank is provided with means remote from the pointed end to couple an instrumentality to the shank whereby the instrumentality is supported solely from the magnet.

5. In a hole center finder, the combination of a holder adapted to be attached to a work piece, a hole center finding assembly, a shank rigidly attached to said holder and supporting said assembly, said assembly including an outer end member and a collar movably related thereto, said assembly adapted to be passed into a hole in the work piece whereby said collar side wall engages the edges of the hole, and resilient means reacting on said collar and normally biasing said collar in a direction so that it abuts said outer end member.

6. The combination of claim 5 wherein said holder consists of a magnet.

7. In a hole center finder for use with a work piece having a hole therein, a holder, a shank rigidly attached to said holder, said holder adapted to engage the work piece, said shank protruding outwardly of said holder and adapted to pass into the hole in the work piece, a collar having an outer surface, means mounting said collar on said shank for limited movement, the outer surface of said collar adapted to engage in the hole so that the center line of the shank becomes aligned with and becomes located on the center line of the hole, and means connected with said shank for attaching an instrumentality to the shank.

8. In combination with a workpiece having a plurality of holes therein, a center finder engageable with each of said holes, and a sighting device carried by each center finder for enabling comparison of the centers of the holes, each center finder including a holder detachably engaged with the workpiece, a shank mounted on said holder and having a pointed end for projecting through a hole in the workpiece, a tapered collar slidably mounted on said shank for engagement with the periphery of the hole into which the shank is inserted thereby centering the shank in relation to the hole, said sighting device being attached to the shank so that the sighting device also will be centered in relation to the hole when the shank is centered, said holder being engaged with the workpiece for lateral movement in relation to the center of the hole.

9. The structure as defined in claim 8 wherein said holder is in the form of a permanent magnet capable of being relatively easily moved along the surface of the workpiece but having sufficient holding force to support the shank and sighting device, said shank having a shoulder thereon retaining the collar on the shank, a spring encircling the shank and engageable with the collar for urging the collar outwardly toward the pointed end of the shank thereby biasing the tapered collar against the periphery of the opening thus centralizing the shank in the opening.

References Cited in the file of this patent

UNITED STATES PATENTS

| | | |
|---|---|---|
| 610,021 | Bogart | Aug. 30, 1898 |
| 1,233,458 | Fisk | July 17, 1917 |
| 2,413,628 | Hinds | Dec. 31, 1946 |
| 2,526,528 | Zickler | Oct. 17, 1950 |
| 2,531,799 | Zumwalt | Nov. 28, 1950 |
| 2,729,896 | Rosenblum | Jan. 10, 1956 |
| 2,794,263 | Cranmer | June 4, 1957 |
| 2,873,531 | Chick | Feb. 17, 1959 |

FOREIGN PATENTS

| | | |
|---|---|---|
| 467,263 | Italy | June 4, 1957 |